United States Patent [19]
Kolomeitsev

[11] Patent Number: 6,025,668
[45] Date of Patent: *Feb. 15, 2000

[54] VARIABLE RELUCTANCE MOTOR HAVING BIFURCATED STATOR POLES

[75] Inventor: Sergei F. Kolomeitsev, Sylvania, Ohio

[73] Assignee: Dana Corporation, Toledo, Ohio

[*] Notice: This patent issued on a continued prosecution application filed under 37 CFR 1.53(d), and is subject to the twenty year patent term provisions of 35 U.S.C. 154(a)(2).

[21] Appl. No.: 08/569,365

[22] Filed: Dec. 8, 1995

[51] Int. Cl.$^7$ .............................. H02K 1/14; H02K 1/16; H02K 1/24
[52] U.S. Cl. ........................ 310/187; 310/166; 310/168; 310/254; 310/269
[58] Field of Search ..................... 310/187, 168, 310/162, 166, 254, 261, 269, 49 R

[56] References Cited

U.S. PATENT DOCUMENTS

| | | | |
|---|---|---|---|
| 3,439,200 | 4/1969 | Saito et al. | 310/49 R |
| 3,767,950 | 10/1973 | Ainvarg | 310/168 |
| 3,984,711 | 10/1976 | Kordik | 310/156 |
| 3,999,107 | 12/1976 | Reuting | 318/135 |
| 4,000,452 | 12/1976 | Heine | 318/696 |
| 4,186,316 | 1/1980 | Singh | 310/49 R |
| 4,327,302 | 4/1982 | Hershberger | 310/156 |

(List continued on next page.)

FOREIGN PATENT DOCUMENTS

| | | |
|---|---|---|
| 0170741 | 2/1986 | European Pat. Off. . |
| 1277876 | 6/1972 | United Kingdom . |
| 2260860 | 4/1993 | United Kingdom . |

OTHER PUBLICATIONS

Variable Speed Drives Using Multi–Tooth Per Pole Switch Reluctance Motors, J.W. Finch et al., pp. 293–302, 13th Incremental Motion Control Systems Symposium, University of Illinois, 1984.

*Primary Examiner*—Nestor Ramirez
*Assistant Examiner*—Karl I. E. Tamai
*Attorney, Agent, or Firm*—MacMillan, Sobanski & Todd, LLC

[57] ABSTRACT

A variable reluctance electric motor includes a hollow cylindrical stator having a plurality of radially inwardly extending poles. Each of the stator poles is generally rectangular in cross sectional shape and is bifurcated into two stator teeth at its radially innermost end by a central, longitudinally extending slot. The outer circumferential edges of the stator pole teeth are beveled at their respective junctions with the sides of the stator pole. A stator pole gap width is defined between adjacent stator poles. A slot width is defined within each of the stator poles between the adjacent longitudinally extending edges of the slot. The ratio of the stator pole gap width to the stator pole slot width is in the range of from about 1.8 to about 2.3. A cylindrical rotor is co-axially supported within the stator for relative rotational movement. The rotor has a plurality of radially outwardly extending poles formed thereon. Each of the rotor poles is generally rectangular in cross sectional shape. The outer circumferential edges of the rotor poles are beveled at their respective junctions with the sides of the rotor pole to provide a tapered end. Each of the rotor poles defines a width which is measured at the outer circumferential surface thereof, extending between the two beveled edges. The rotor poles also defines a pitch which is measured from one point on a first rotor pole to the same point on the adjacent rotor pole. The ratio of the rotor pole width to the rotor pole pitch is in the range of from about 0.40 to about 0.47. Preferably, a motor having N stator poles will have 2·N stator pole teeth, and a rotor employed in such a motor 20 will have (2·N)+2 rotor poles.

6 Claims, 2 Drawing Sheets

U.S. PATENT DOCUMENTS

| | | | |
|---|---|---|---|
| 4,475,051 | 10/1984 | Chai et al. | 310/49 R |
| 4,647,802 | 3/1987 | Konecny | 310/49 R |
| 4,748,362 | 5/1988 | Hedlund | 310/168 |
| 4,794,286 | 12/1988 | Taenzer | 310/17 |
| 4,873,462 | 10/1989 | Harned | 310/49 R |
| 4,883,999 | 11/1989 | Hendershot | 310/254 |
| 4,947,066 | 8/1990 | Ghibu et al. | 310/49 R |
| 5,015,903 | 5/1991 | Hancock et al. | 310/168 |
| 5,051,640 | 9/1991 | Freise | 310/162 |
| 5,086,245 | 2/1992 | Sieja et al. | 310/216 |
| 5,117,144 | 5/1992 | Torok | 310/269 |
| 5,220,228 | 6/1993 | Sibata | 310/254 |

VARIABLE RELUCTANCE MOTOR HAVING BIFURCATED STATOR POLES

BACKGROUND OF THE INVENTION

This invention relates in general to electric motors and in particular to an improved stator pole structure for a variable reluctance electric motor.

Electric motors are well known devices which convert electrical energy to rotary mechanical energy. To accomplish this, electric motors establish and control electromagnetic fields so as to cause the desired rotary mechanical motion. There are many different types of electric motors, each utilizing different means for establishing and controlling these electromagnetic fields. Consequently, the operating characteristics of electric motors vary from type to type, and certain types of electric motors are better suited for performing certain tasks than others.

Synchronous motors constitute one principal class of electric motors. The two basic components of a synchronous motor are (1) a stationary member which generates a rotating electromagnetic field, generally referred to as the stator, and (2) a rotatable member driven by the rotating magnetic field, generally referred to as the rotor. Synchronous motors are characterized in that the rotational speed of the rotor is directly related to the frequency of the electrical input signal applied thereto and, therefore, the rotational speed of the electromagnetic field generated thereby. Thus, so long as the frequency of the applied electrical input signal is constant, the rotor will be driven at a constant rotational speed. Within this broad definition, however, the structure and operation of synchronous electric motors vary widely.

One variety of synchronous electric motor is a variable reluctance motor. Variable reluctance motors operate on the principle that a magnetic field which is created about a component formed from a magnetically permeable material will exert a mechanical force on that component. This mechanical force will urge the component to become aligned with the magnetic flux (lines of force) generated by the magnetic field. Thus, by using the stator to establish and rotate a magnetic field about a rotor formed from a magnetically permeable material, the rotor can be driven to rotate relative to the stator. The resistance to the passage of this magnetic flux from the stator to the rotor is referred to as reluctance. The magnitude of this reluctance changes with the rotational position of the rotor relative to the stator. Thus, electric motors of this type are commonly referred to as variable reluctance motors.

In a conventional variable reluctance motor, the stator is generally hollow and cylindrical in shape, having a plurality of radially inwardly extending poles which extend longitudinally throughout the length thereof. Similarly, the rotor is generally cylindrical in shape, having a plurality of radially outwardly extending poles which extend longitudinally throughout the length thereof. The stator and the rotor are both formed from a magnetically permeable material. A winding of an electrical conductor is provided about each of the stator poles. By passing pulses of electrical current through each of the stator windings in a sequential manner, the stator poles can be selectively magnetized so as to attract the rotor poles thereto. Consequently, the rotor will rotate relative to the stator.

Because of the structural geometry of conventional variable reluctance motors, it is desirable that the magnetic flux generated by the electromagnetic fields extend circumferentially throughout the stator and the rotor in a plane which is generally perpendicular to the longitudinal axis of the motor. Any magnetic flux which extend parallel to the longitudinal axis of the motor (often referred to as eddy currents) do not contribute to the attraction of the rotor poles toward the stator poles and, therefore, reduce the overall performance of the motor. To reduce the magnitude of these undesirable eddy currents, it is known to form both the stator and the rotor from a plurality of relatively thin laminations of a magnetically permeable material. Each of these laminations has a cross sectional shape which corresponds to the desired cross sectional shape of the stator and the rotor. The laminations are secured together to form the stator and the rotor.

When selecting any kind of electric motor for use in a particular application, several basic considerations are important. One such consideration is the efficiency of the motor, i.e., the ratio of the mechanical output power (torque in rotary electric motors and force in linear electric motors) to the electrical input power. A second consideration is the maximum amount of torque or force which can be generated by the electric motor. A third consideration is the physical size of the electric motor. Obviously, it would be desirable to increase the efficiency and output torque of the electric motor, while reducing (or at least not increasing) the physical size thereof. A fourth consideration is the amount of variation in the torque generated by the motor during operation, often referred to as torque ripple. Torque ripple occurs as a result of the sequential energization and de-energization of the various phase windings of the motor. Ideally, the amount of this torque ripple is maintained at a minimum during operation such that the torque generated by the motor is essentially uniform.

SUMMARY OF THE INVENTION

This invention relates to an improved structure for a variable reluctance electric motor. The motor includes a hollow cylindrical stator having a plurality of radially inwardly extending poles. Each of the stator poles is generally rectangular in cross sectional shape and is bifurcated into two stator teeth at its radially innermost end by a central, longitudinally extending slot. The outer circumferential edges of the stator pole teeth are beveled at their respective junctions with the sides of the stator pole. A stator pole gap width is defined between adjacent stator poles. A slot width is defined within each of the stator poles between the adjacent longitudinally extending edges of the slot. The ratio of the stator pole gap width to the stator pole slot width is in the range of from about 1.8 to about 2.3. A cylindrical rotor is co-axially supported within the stator for relative rotational movement. The rotor has a plurality of radially outwardly extending poles formed thereon. Each of the rotor poles is generally rectangular in cross sectional shape. The outer circumferential edges of the rotor poles are beveled at their respective junctions with the sides of the rotor pole to provide a tapered end. Each of the rotor poles defines a width which is measured at the outer circumferential surface thereof, extending between the two beveled edges. The rotor poles also define a pitch which is measured from one point on a first rotor pole to the same point on the adjacent rotor pole. The ratio of the rotor pole width to the rotor pole pitch is in the range of from about 0.40 to about 0.47. Preferably, a motor having N stator poles will have 2·N stator pole teeth, and a rotor employed in such a motor will have (2·N)+2 rotor poles.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
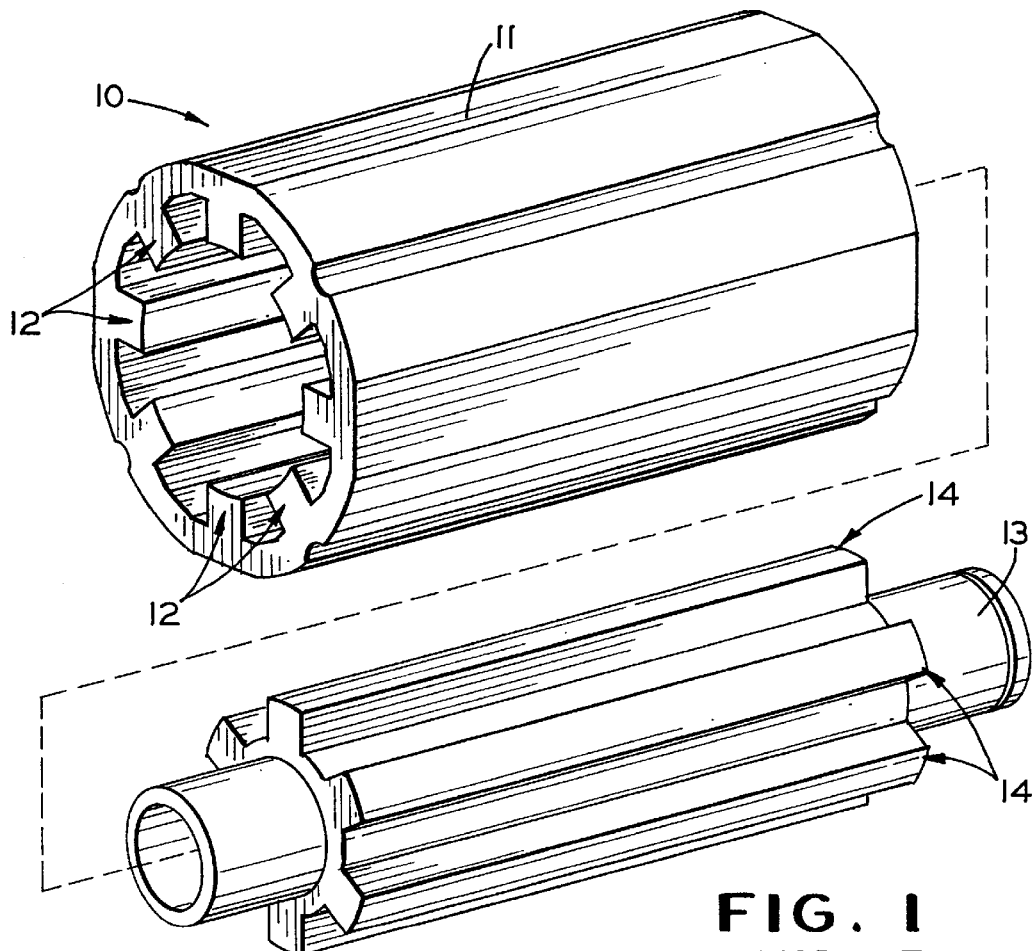
FIG. 1 is an exploded perspective view of a portion of a conventional variable reluctance electric motor.
Figure 2:
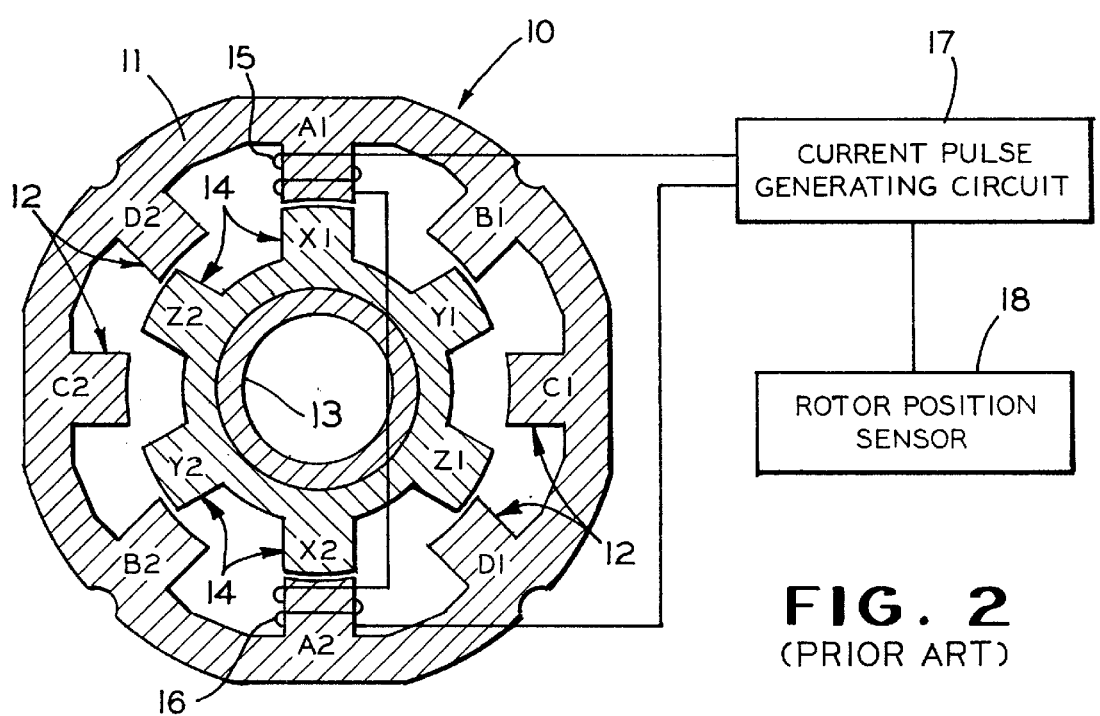
FIG. 2 is a schematic end elevational view of the conventional variable reluctance electric motor illustrated in FIG. 1, together with an external control circuit.

Referring now to the drawings, there is illustrated in FIGS. 1 and 2 a conventional variable reluctance motor, indicated generally at 10. The prior art motor 10 includes a stator 11 which is generally hollow and cylindrical in shape. A plurality of radially inwardly extending poles, indicated generally at 12, are formed on the stator 11 and extend longitudinally throughout the length thereof. The stator poles 12 are preferably provided in opposed pairs, such as shown in FIG. 2 at A1 and A2, B1 and B2, C1 and C2, and D1 and D2. Thus, eight stator poles 12 are provided on the illustrated stator 11. However, it is known in the art to provide the stator 11 with either a greater or lesser number of stator poles 12.

Each of the stator poles 12 is generally rectangular in cross sectional shape. The radially innermost surfaces of the stator poles 12 are slightly curved so as to define an inner diameter. The stator 11 and the stator poles 12 are formed from a magnetically permeable material, such as iron. As will be explained below, each of the stator pole pairs A1 and A2, B1 and B2, C1 and C2, and D1 and D2 represents one phase for energizing the variable reluctance motor 10 for operation. Thus, the illustrated prior art motor 10 has four electrical phases for energization. However, it is known to provide such a motor 10 with a greater or lesser number of electrical phases for energization. The stator 11 may be formed from a plurality of relatively thin laminations of a magnetically permeable material, as discussed above.

A cylindrical rotor 13 is co-axially supported within the stator 11 for relative rotational movement. The rotor 13 has a plurality of radially outwardly extending poles, indicated generally at 14, formed thereon. As with the stator poles 12, the rotor poles 14 extend longitudinally throughout the length of the rotor 13 and are preferably provided in opposed pairs, such as shown at X1 and X2, Y1 and Y2, and Z1 and Z2. Thus, six rotor poles 14 are provided on the illustrated rotor 13. However, it is known in the art to provide the rotor 13 with either a greater or lesser number of rotor poles 14. Generally, the number of rotor poles 14 is different from the number of stator poles 12.

Each of the rotor poles 14 is generally rectangular in cross sectional shape. The radially outermost surfaces of the rotor poles 14 are slightly curved so as to define an outer diameter. The outer diameter defined by the rotor poles 14 is preferably only slightly smaller than the inner diameter defined by the stator poles 12. Thus, a radial gap is defined between the stator poles 12 and the rotor poles 14 when they are aligned. The size of this radial gap is preferably relatively small. The rotor 13 and the rotor poles 14 are also formed from a magnetically permeable material, such as iron. The rotor 13, may be formed from a plurality of relatively thin laminations of a magnetically permeable material, as discussed above.

An electrical conductor is wound about each of the stator poles 12. As schematically shown in FIG. 2, a first pair of windings 15 and 16 are provided on the opposed stator poles A1 and A2, respectively. Second, third, and fourth pairs of windings (not shown) are similarly provided on the other stator pole pairs B1 and B2, C1 and C2, D1 and D2. The windings 15 and 16 are connected to an electrical current pulse generating circuit 17, either in series (as illustrated) or in parallel. The current pulse generating circuit 17 is conventional in the art and is adapted to selectively generate pulses of electrical current through the windings 15 and 16. Similar current pulse generating circuits 17 (not shown) are provided for the other pairs of windings on the stator pole pairs B1 and B2, C1 and C2, and D1 and D2.

The timing, magnitude, and polarity of the electrical current pulses generated by the four current pulse generating circuits 17 is determined by the rotational position of the rotor 13 relative to the stator 11. To accomplish this, a conventional sensor 18 is provided which generates a signal which is representative of such relative rotational position. The current pulse generating circuits 17 are responsive to this rotor position signal for generating the current pulses to the various pairs of windings 15 and 16 of the motor 10 in a predetermined manner described below. As a result, the rotor 13 is rotatably driven relative to the stator 11. Alternatively, the rotor position sensor 18 may be omitted, and the current pulse generating circuits 17 may be activated by a conventional phase sequence (not shown) which operates independently of the rotational position of the rotor 13.

When electrical current is supplied to the windings 15 and 16 by the current pulse generating circuit 17, both the stator 11 and the rotor 13 become magnetized. The windings 15 and 16 are oppositely wound such that stator pole A1 (upon which the winding 15 is disposed) is energized to become a magnetic north pole, while the stator pole A2 (upon which the winding 16 is disposed) is energized become a magnetic south pole. As a result; a magnetic circuit is created between these opposed stator poles A1 and A2. Consequently, magnetic flux (lines of force) are created between the north stator pole A1 and the south stator pole A2. The magnetic flux passes from the north stator pole A1 through the nearest rotor pole X1, through the body of the rotor 13, and from the opposed rotor pole X2 to the south stator pole A2. The magnetic circuit between the north and south stator poles A1 and A2 is completed through the outer annular portion of the stator 11.

The resistance to the passage of magnetic flux from the north stator pole A1 to the nearest rotor pole X1 (and similarly from the south stator pole A2 to the nearest rotor pole X2) is referred to as reluctance, as discussed above. The magnitude of this reluctance changes with the rotational position of the rotor poles 14 relative to the stator poles 12. Reluctance is at a minimum when the rotor poles 14 are radially aligned with the stator poles 12, as with A1, X1 and A2, X2 in FIG. 2. Consequently, the generation of the magnetic circuit described above produces a torque which tends to align the opposed rotor poles X1 and X2 with the energized opposed stator poles A1 and A2, as shown in FIG. 2.

To effect rotation of the rotor 13 relative to the stator 11, the flow of electrical current to the first pair of windings 15 and 16 on the stator poles A1 and A2 is turned off, and a flow of electrical current to the second pair of windings on the stator poles B1 and B2 is turned on. As a result, B1 is energized to become a magnetic north pole, and B2 is energized to become a magnetic south pole. Such energization attracts the nearest rotor poles Y1 and Y2 to become aligned with the energized stator poles B1 and B2. Consequently, the rotor 13 is rotated relative to the stator 11. To continue such rotation of the rotor 13, the stator poles B1 and B2 are de-energized, and the stator poles C1 and C2 are energized. Thus, the rotor poles Z1 and Z2 are attracted to the stator poles C1 and C2. By sequentially energizing the stator poles 12 in this manner, the rotor poles 14 are sequentially attracted thereto. As a result, the rotor 13 rotates relative to the stator 11 in a direction (counterclockwise in the illustrated embodiment) which is opposite to the direction (clockwise in the illustrated embodiment) in which the stator pole pairs A1 and A2, B1 and B2, C1 and C2, and D1 and D2 are energized.

As mentioned above, the timing and magnitude of the pulses of current are controlled in response to the rotational position of the rotor 13 relative to the stator 11. Typically, this means that the current pulse generated to a winding on a particular stator pole 12 will be initially increased to a maximum magnitude, then substantially discontinued before the attracted rotor pole 14 is aligned therewith. For example, the current pulse generated to the first winding can be gradually decreased as the current pulse generated to the next winding is gradually increased. This is done to permit a smooth transition of a rotor pole 14 past an attracting stator pole 12. As a result, the rotor 13 will rotate at a relatively constant speed without stuttering movement from phase to phase.

In the illustrated embodiment, the stator 11 is provided with eight stator poles 12, while the rotor 13 is provided with six rotor poles 14. From the above discussion, it can be seen that each time one of the stator pole pairs A1 and A2, B1 and B2, C1 and C2, and D1 and D2 is energized, the rotor 13 will be rotated fifteen degrees relative to the stator 11. Thus, the stator pole pairs A1 and A2, B1 and B2, C1 and C2, and D1 and D2 must be energized in sequence six times in order to rotate the rotor 13 throughout one complete revolution. Because the rotational speed of the rotor 13 is directly related to the frequency of the current pulses supplied to the stator poles 12, the motor 10 operates as a synchronous motor. By varying the number of stator poles 12 and rotor poles 14, the rotational speed of the rotor 12 can be varied with respect to the frequency of the current pulses supplied to the stator 11. As mentioned above, the structure and operation of the variable reluctance motor 10 described thus far is conventional in the art.

Figure 3:
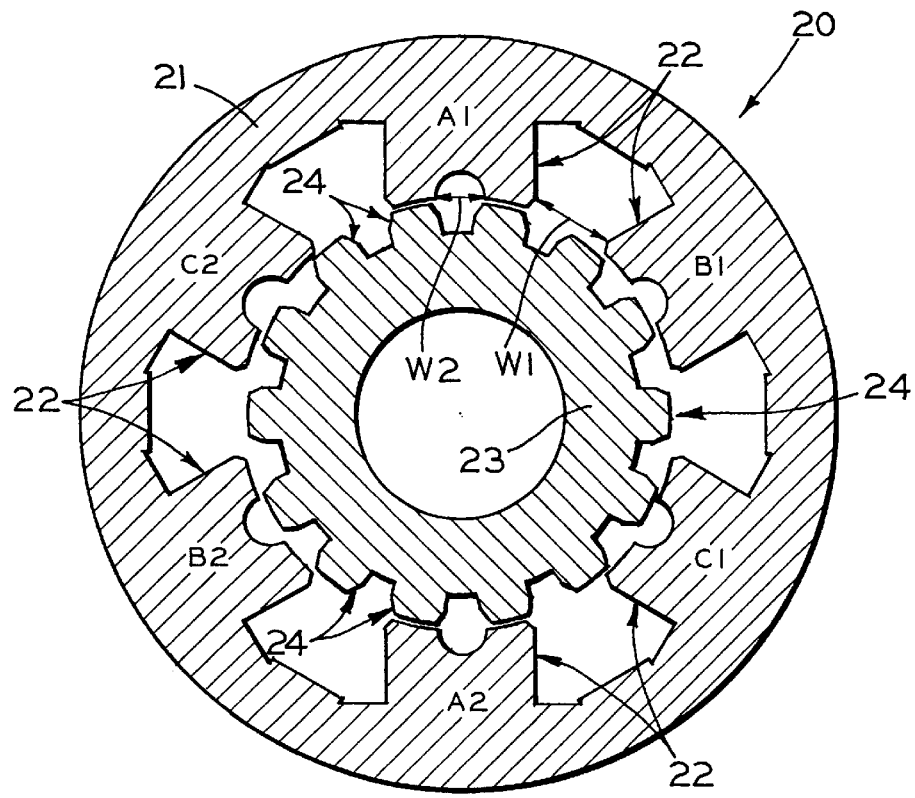
FIG. 3 is a schematic end elevational view similar to FIG. 2 of a variable reluctance electric motor in accordance with this invention.
Figure 4:
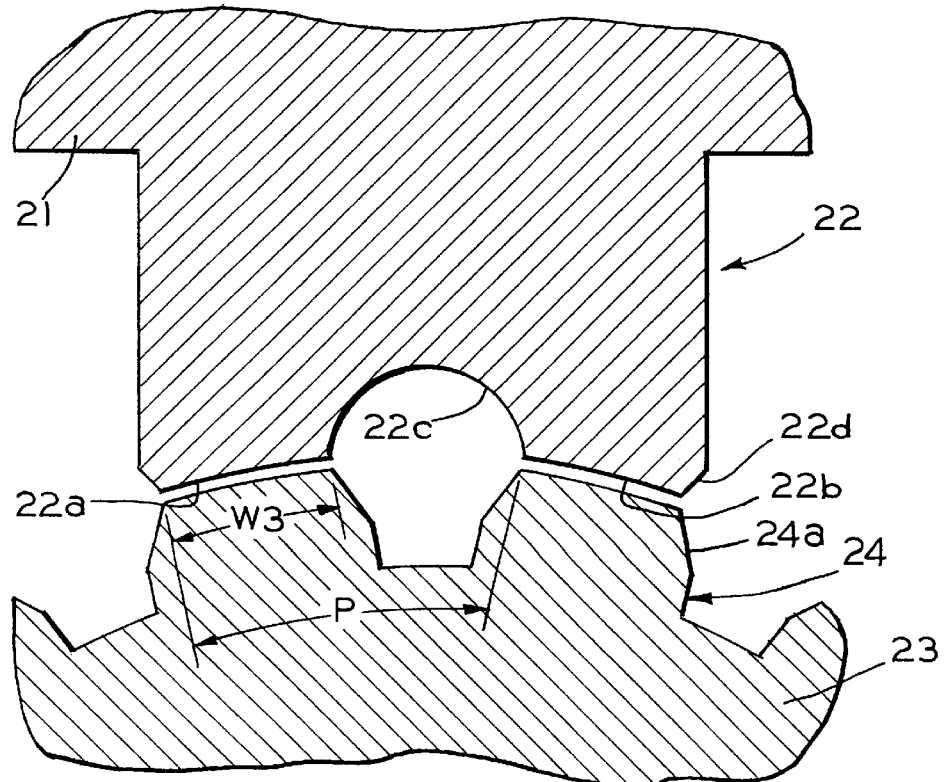
FIG. 4 is an enlarged schematic end elevational view of a portion of the variable reluctance electric motor illustrated in FIG. 3.

Referring now to FIGS. 3 and 4, there is illustrated a schematic end elevational view similar to FIG. 2 of a variable reluctance electric motor, indicated generally at 20, in accordance with this invention. The motor 20 of this invention includes a stator 21 which is generally hollow and cylindrical in shape. A plurality of radially inwardly extending poles, indicated generally at 22, are formed on the stator 21 and extend longitudinally throughout the length thereof. In the illustrated embodiment, the stator poles 22 are provided in three sets of opposed pairs, such as shown in FIG. 3 at A1 and A2, B1 and B2, and C1 and C2. Thus, six stator poles 22 are provided on the illustrated stator 21. However, as will be explained below, the stator 21 may be provided with either a greater or lesser number of stator poles 22.

Referring specifically to FIG. 3, the structure of one of the stator poles 22 is illustrated in detail. As shown therein, the stator pole 22 is generally rectangular in cross sectional shape. However, at their radially innermost ends, each of the stator poles 22 is bifurcated into two stator pole teeth 22a and 22b by a central, longitudinally extending slot 22c having a semi-circular cross section. Thus, twelve stator pole teeth 22a and 22b are provided on the illustrated stator 21. The radially innermost surfaces of the stator pole teeth 22a and 22b are slightly curved so as to define an inner diameter. The outer circumferential edges of the stator pole teeth 22a and 22b are beveled, as shown at 22d, at their respective junctions with the sides of the stator pole 22. Thus, each of the stator poles 22 is formed having a tapered end.

A stator pole gap width is defined, which is designated as W1 in FIG. 3, between adjacent stator poles 22. The stator pole gap width W1 is measured at the inner radial edge of the stator poles 22 and extends between the outer circumferential edge of the stator pole tooth 22a of one stator pole 22 and the outer circumferential edge of the stator pole tooth 22b of an adjacent stator pole 22. A slot width, which is designated as W2 in FIG. 3, is defined within each of the stator poles 22. The stator pole slot width W2 is measured between the adjacent longitudinally extending edges of the slot 22c. In the illustrated embodiment, the ratio of the stator pole gap width W1 to the stator pole slot width W2 is in the range of from about 1.8 to about 2.3. In other words, the stator pole gap width W1 is approximately two times greater than the stator pole slot width W2.

The stator 21 and the stator poles 22 are formed from a magnetically permeable material, such as iron. As will be explained below, each of the stator pole pairs A1 and A2, B1 and B2, and C1 and C2 represents one phase for energizing the variable reluctance motor 20 for operation. Thus, the illustrated motor 20 has three electrical phases for energization. However, as will be explained below, the motor 20 may be provided with a greater or lesser number of electrical phases for energization. The stator 21 may be formed from a plurality of relatively thin laminations of a magnetically permeable material, as discussed above.

A cylindrical rotor 23 is co-axially supported within the stator 21 for relative rotational movement. The rotor 23 has a plurality of radially outwardly extending poles, indicated generally at 24, formed thereon. As with the stator poles 22, the rotor poles 24 extend longitudinally throughout the length of the rotor 23 and are preferably provided in opposed pairs. In the illustrated embodiment, fourteen rotor poles 24 are provided on the rotor 23. However, as will be explained below, the rotor 23 may be provided with either a greater or lesser number of rotor poles 24.

Each of the rotor poles 24 is generally rectangular in cross sectional shape. The radially outermost surfaces of the rotor poles 24 are slightly curved so as to define an outer diameter. The outer diameter defined by the rotor poles 24 is preferably only slightly smaller than the inner diameter defined by the stator poles 22. Thus, a radial gap is defined between the stator poles 22 and the rotor poles 24 when they are aligned. The size of this radial gap is preferably relatively small. The rotor 23 and the rotor poles 24 are also formed from a magnetically permeable material, such as iron. The outer circumferential edges of the rotor poles 24 are beveled, as shown at 24a, at their respective junctions with the sides of the rotor pole 24. Thus, each of the rotor poles 24 is formed having a tapered end. The rotor 23 may be formed from a plurality of relatively thin laminations of a magnetically permeable material, as discussed above.

Each of the rotor poles 24 defines a width, which is designated as W3 in FIG. 4. The width W3 of a rotor pole 24 is measured at the outer circumferential surface thereof, extending between the two beveled edges 24a. The rotor poles 24 also define a pitch, which is designated as P in FIG. 4. The pitch P of the rotor poles 24 is measured from one point (the junction between the left beveled edge 24a and the outer circumferential surface in FIG. 4) on a first rotor pole 24 to the same point on the adjacent rotor pole 24. In the illustrated embodiment, the ratio of the rotor pole width W3 to the rotor pole pitch P in the range of from about 0.40 to about 0.47. In other words, the width W3 of the rotor pole 24 is slightly less than one-half of the pitch P of the rotor poles 24.

Similar to that shown in FIG. 2, an electrical conductor is wound about each of the stator poles 22. These windings have been omitted from FIGS. 3 and 4 for clarity. Nonetheless, a first pair of windings (not shown) are provided on the opposed stator poles A1 and A2, respectively. Second and third pairs of windings (not shown) are similarly provided on the other stator pole pairs B1 and B2, and C1 and C2. The windings are connected to the electrical current pulse generating circuit 17 and are operated as described above to cause rotation of the rotor 23 relative to the stator 21.

As discussed above, the illustrated stator 21 is provided with six stator poles 22 (twelve stator teeth 22a and 22b) and is connected for three phase operation, while the illustrated rotor 23 is provided with fourteen rotor poles 24. More generically, however, the motor 20 may described as having N stator poles 22. Inasmuch as each of the stator poles 22 is bifurcated into two stator pole teeth 22a and 22b, a motor 20 having N stator poles 22 will have 2·N stator pole teeth 22a and 22b. A rotor 23 employed in such a motor 20 will have (2·N)+2 rotor poles 24. Thus, the illustrated motor 20 provided with six [N=6] stator poles 22 has twelve [2·6] stator pole teeth 22a and 22b and fourteen [(2·6)+2] rotor poles 24.

The illustrated motor 20 is a single period motor, wherein each of the pairs of phase windings causes an individual and discrete movement of the rotor 23 relative to the stator 21, and wherein only one pair of the phase windings is energized to cause such movement. As is known in the art, the motor 20 may be formed having two or more periods. For example, the motor 20 may be formed as a two period motor having twelve stator poles 21 and be connected for three phase operation. In such an instance, two pairs of stator poles are simultaneously energized for each phase of operation. Such a motor would have [2·12] or twenty-four stator teeth 22 and [(2·12)+2] or twenty-six rotor poles 24.

It has been found that a motor 20 having the above-described geometry exhibits certain desirable characteristics. First, it has been found that the motor 20 exhibits a relatively higher torque density than conventional motors of comparable size and geometry. Second, it has been found that the motor 20 exhibits a relatively lower torque ripple than conventional motors of comparable size and geometry. As a result, it has been found that the motor 20 is more efficient than conventional motors of comparable size and geometry.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A variable reluctance electric motor comprising:
    a hollow stator formed from a magnetically permeable material and including an inner surface having a plurality of radially inwardly extending poles formed thereon, each of said stator poles being bifurcated to have two radially inwardly extending teeth by a slot defining a slot width, said stator poles defining a stator pole gap width, wherein a ratio of said stator pole gap width to said slot width is in the range of from about 1.8 to about 2.3;
    a rotor formed from a magnetically permeable material and including an outer surface having a plurality of radially outwardly extending poles formed thereon, wherein the number of said rotor poles is equal to twice the number of said stator poles plus two, each of said rotor poles defining a rotor pole width, said rotor poles defining a rotor pole pitch, wherein a ratio of said rotor pole width to said rotor pole pitch is in the range of from about 0.40 to about 0.47;
    means for supporting said rotor for rotation within said stator; and
    a winding of wire disposed about each of said plurality of stator poles, said windings adapted to be connected to a control circuit for selectively passing electrical current therethrough so as to generate respective electromagnetic fields as a plurality of sequentially energized phases, the electromagnetic field generated by each of said windings causing a rotor pole to move toward a position of minimum reluctance relative to a stator pole associated with that winding, thereby causing said rotor to rotate relative to said stator.

2. The variable reluctance electric motor defined claim 1 wherein outer circumferential edges of each stator tooth are beveled.

3. The variable reluctance electric motor defined claim 2 wherein each stator pole is formed having a tapered end.

4. The variable reluctance electric motor defined claim 1 wherein outer circumferential edges of each rotor pole are beveled.

5. The variable reluctance electric motor defined in claim 4 wherein each rotor pole is formed having a tapered end.

6. The variable reluctance electric motor defined in claim 1 wherein said stator has six stator poles and twelve stator teeth and said rotor has fourteen rotor poles.

* * * * *